March 28, 1950 H. H. WOLFE 2,501,980
WATERING OR FEEDING TROUGH FOR ANIMALS
Filed June 29, 1945 3 Sheets-Sheet 1
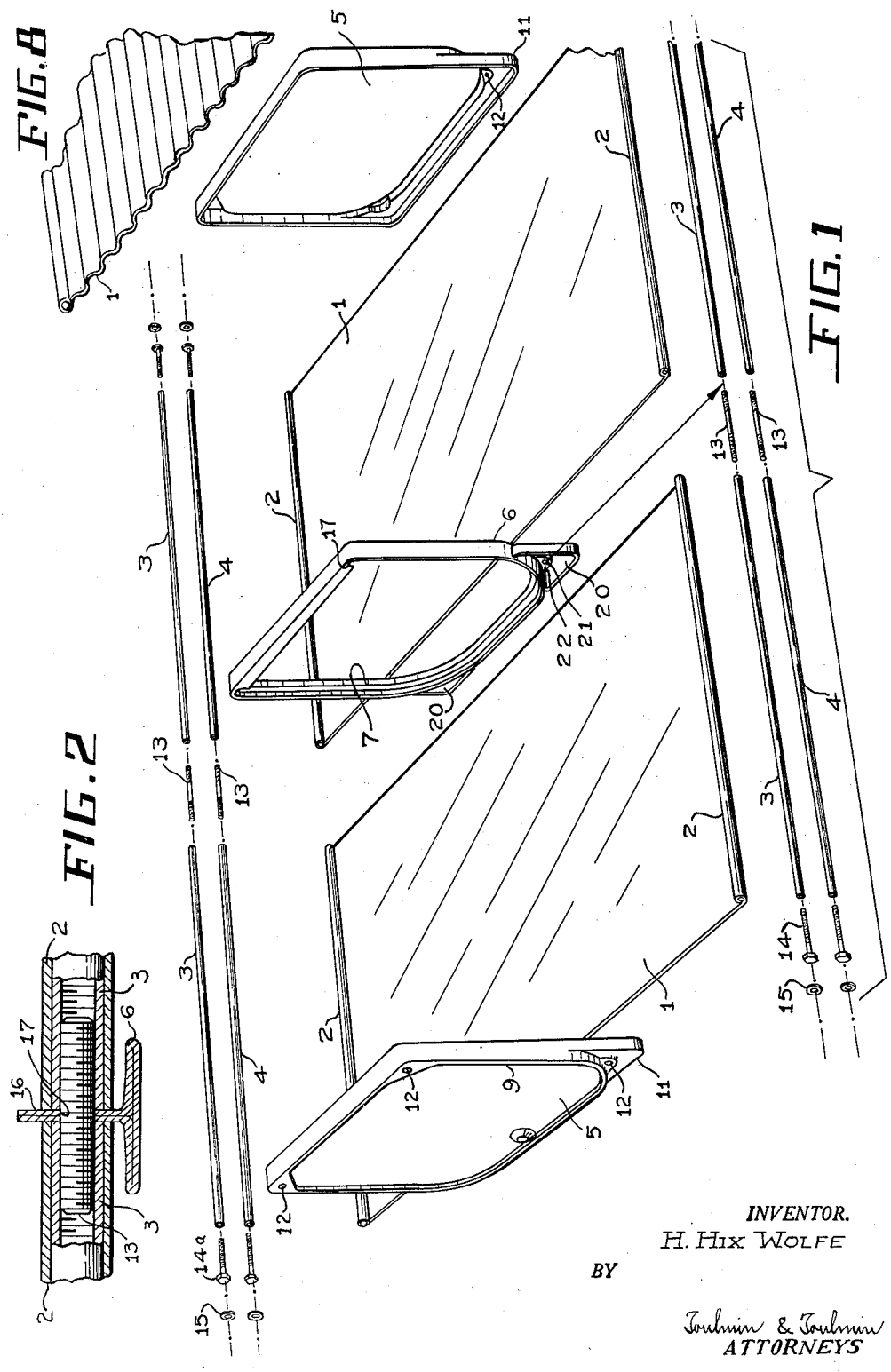
INVENTOR.
H. Hix WOLFE
BY
Toulmin & Toulmin
ATTORNEYS

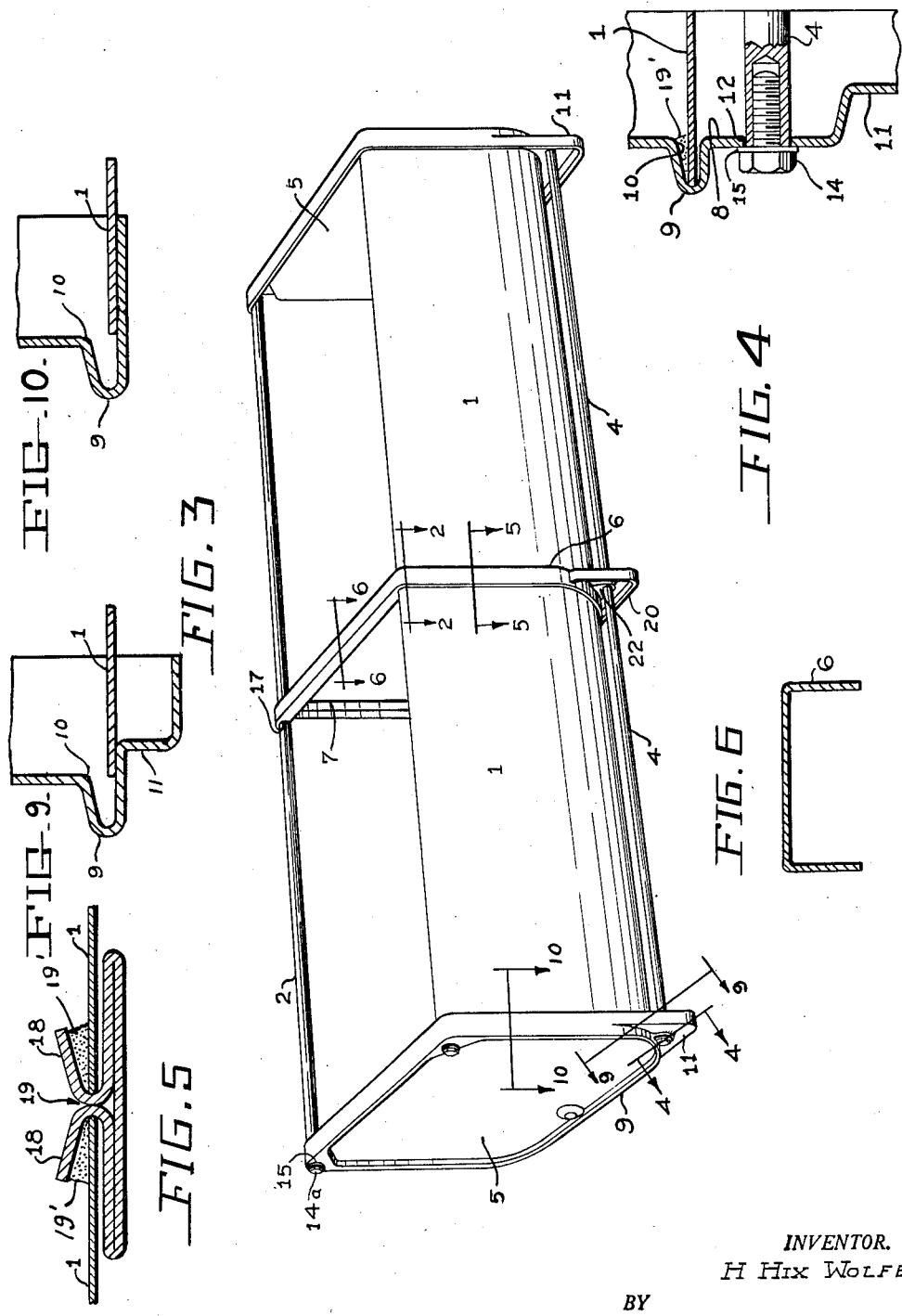

March 28, 1950     H. H. WOLFE     2,501,980
WATERING OR FEEDING TROUGH FOR ANIMALS
Filed June 29, 1945     3 Sheets-Sheet 3

INVENTOR.
H. Hix Wolfe
BY
Toulmin & Toulmin
ATTORNEYS

Patented Mar. 28, 1950

2,501,980

UNITED STATES PATENT OFFICE 2,501,980

WATERING OR FEEDING TROUGH FOR ANIMALS

H. Hix Wolfe, Dayton, Ohio, assignor to The Dayton Pump and Manufacturing Company, Dayton, Ohio, a corporation of Ohio Application June 29, 1945, Serial No. 602,195

2 Claims. (Cl. 220—4)

The present invention relates to watering or feeding troughs for animals.

Various types of troughs have been used; some are made of cast metal, others are assembled out of wood, but in practically every case the trough is manufactured and shipped in complete form. This entails considerable bulk, difficulty of handling, which results in large transportation charges to be absorbed by the ultimate user.

Moreover, when the troughs are made up and shipped in this manner it is difficult, if not impossible, to add extensions thereto or otherwise to change the length of the structure.

The primary object of the invention is to provide an improved watering or feeding trough which can be made inexpensively out of metal and shipped in a knocked-down condition.

Another object is to provide a trough which lends itself to fabrication out of sheet metal pressed or punched and when assembled by the user can be bent to proper shape.

Still another object is to provide a trough in which extension parts can be obtained and added to the original trough without difficulty so that the proper length of trough can be used at all times.

These objects are carried out in brief by providing a series of frames, preferably made out of sheet metal, bent to shape and so arranged to receive the sheet metal trough shells and to hold the shells in proper shape and in fixed relation.

The invention will be better understood when reference is made to the following description and the accompanying drawings, in which:

Figure 1 is an exploded or disassembled view in perspective of the parts which form an improved trough, the parts being arranged in their relative position as preparatory to assembly and before being secured together.

Figure 2 is a fragmentary sectional view taken along line 2—2 in Figure 3.

Figure 3 is a perspective view of the assembled trough made from the parts shown in Figure 1.

Figure 4 is a fragmentary sectional view taken along line 4—4 in Figure 3, while Figure 5 is a corresponding view taken along line 5—5 in the same figure.

Figure 6 is a sectional view taken along line 6—6 in Figure 3 to show the shape of the upper brace members.

Figure 8 is a modification showing the use of corrugated sheet material for the main trough portion.

Figure 7:
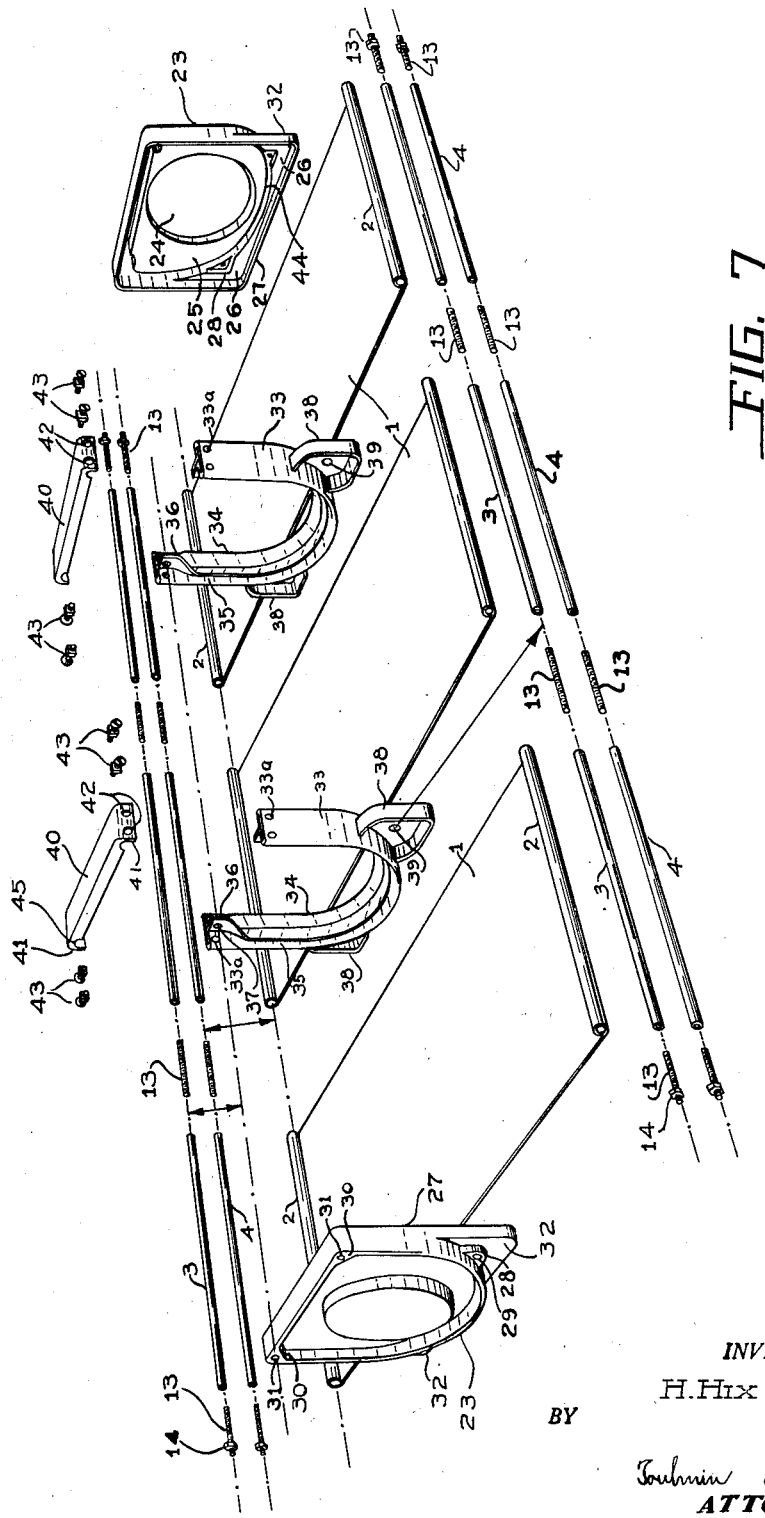
Figure 7 is a perspective disassembled view of parts for making a modified form of knocked-down trough.

Figures 9 and 10 represent sectional views taken along lines 9—9 and 10—10 respectively in Fig. 3 to show the initial position taken by the casing units with respect to the end frames before the assembly nuts are tightened.

Referring to Figure 1, reference character 1 refers to fairly thin sheet metal plates which are preferably galvanized on both sides. These plates are of rectangular configuration somewhat longer as measured transversely of the trough and the short ends of the metal sheets are provided with rolled up portions, as indicated at 2. These portions have a tubular shape with an internal diameter sufficiently large for loosely receiving four rods 3 in case the trough is made up in two sections, as illustrated. The rods 4 may be of the same size as rods 3 and their purpose is to serve as spacers for the lower portions of the frame members which receive the metal shells 1.

The frames, of which there are three in the case of a two section trough, may comprise a pair of identically shaped end members or headers 5 which are completely closed and an intermediate member 6 which is provided with a large opening, indicated at 7, for permitting flow of liquid between the two sections of the trough. The end frame members 5 may be made of sheet metal and are given a dished-out shape, preferably in a press, the central projecting portion extending endwise outwardly from the trough as is indicated at 8 in Fig. 4. In addition there is also provided an outwardly extended hollow beaded portion 9 which follows the edges of the frame and in general takes a semi-circular configuration with somewhat sharper or squared corners. The bead 9 on each frame end member 5 forms recesses, indicated at 10, at the interior of the frame members for loosely receiving the outer long edge of each metal shell 1 to constrain these shells to the semi-circular configuration or other convenient shape of the bead as can be readily seen in Fig. 3. At the two lower corners of each frame member there is a portion 11 which is offset or dished-out to a less degree than the main portion in order to provide feet for the trough and to give it stability of position.

Openings 12 are provided at each corner of these frame members for loosely receiving the rods 3, 4 (Fig. 1). These rods are solid throughout their length but at each end are provided with countersunk openings which are threaded to receive threaded studs 13 which may project beyond the surfaces of the frames. However, if desired, the rods may be hollow and constituted of common pipe or tubing. A bolt 14 and washer 15 may be threaded on each group of four studs at the end frame members so as to hold the outermost ends of the rods 3, 4 in place.

The inner edges of the metal sheet shells 1 are received by the frame 6 which, as stated hereinbefore, is not solid but has a large opening therethrough. This intermediate frame member is preferably made of sheet metal, pressed to form and in general has a T cross-section of which the horizontal portion of the T section constitutes the outer surface of the frame. The upper cross member of the frame may have an inverted U section as shown in Fig. 6, while the two upper corners of the frame may take a section, indicated in Fig. 2, in which a wide inwardly projecting bead 16 is provided for receiving an opening 17. There is one such opening at each of the two upper corners and the purpose of the opening will be explained hereinafter. The two oppositely disposed sides of the frame and the lower cross member may have a section similar to that shown in Fig. 5 in which a pair of outwardly flared strips 18 are provided at a position intermediate the width of the frame. These strips preferably abut one another at 19 in order to increase the strength of the frame. The metal sheets 1 are received by the recesses formed within the bent strip portions 18, as shown in Fig. 5, and are therefore constrained to roughly a semi-circular shape similar to that provided at the end frames 5. In order to render the joints waterproof, a quantity of a sealing compound 19' such as roofing cement, tinner's cement or any other fibrous tar base material may be wedged by hand into the outer recesses formed between the plate 1 and the bent portions 18, as shown in Fig. 5. A cement of this character is designed to harden on the outside but to remain plastic on the inside. A similar mass of cement 19' may also be tucked into the recesses 16 (Fig. 4) between the plate 1 and the interior surface of the bead 9.

A pair of feet 20, also made of sheet metal, are secured in any suitable and well-known manner to the two lower corners of the frame in order to give an approximate straight line effect to the lower surface of the frame and thus serve as one of the pedestals for the trough. The feet 20 are preferably of triangular shape with a rib extending around the outer edge of a vertical triangular plate member for strength. A boss 22 extends from the edge of the frame 6 into the interior of each foot and may be formed by depressing a portion out of the material of the foot webbing. An opening 21 passes through the center of the boss for receiving the threaded stud 13. The studs 13 pass loosely through the openings 17 at the two upper corners of the intermediate frame and also through the openings 21 at the lower corners of the frame. These studs threadedly engage the countersunk openings at the inner ends of the rods 3, 4 as shown in Fig. 2, and as was also explained these rods 3 are contained within the rolled edges 2 of the plates 1.

Thus, when the rods 3 are threaded through the rolled edges of the plates 1 and are joined together at the central position by the studs 13, the plates 1 which have already been constrained to take an approximately semi-circular shape at the end plates 5 as was explained hereinbefore are now caused to maintain a semi-circular shape at their inner edges so as to form a pair of compartments closed on three sides but open at the top as shown in Fig. 3. The rods 4 are also secured together at their inner ends by studs 13 which pass through the openings 21 of the intermediate frame and are secured to the outer frames 5 by the bolts 14. These rods therefore serve to space the lower portions of the three frames from one another and to cause the frames to hold the plates 1 rigidly in position.

As shown in the small section views Figs. 9 and 10, when the sheets 1 are first presented to the end frames, the sheets rest on the flat portion of the bead. However, when the nuts 14 and 14a are tightened the plates move edgewise into the interior of the beads and take a position in the middle of the bead so as to permit the insertion of sealing compound into the inner space thus formed.

It is apparent that instead of employing only one intermediate frame and two shell members 1, I may form the trough into three, four or any number of sections desired by simply providing additional intermediate frames and extra lengths of rods 3 and 4 together with additional studs 13. It is also evident that the whole trough can be readily disassembled and shipped in a knocked-down condition because, with the exception of the rods 3, 4 and the studs, all parts have a flat configuration since the plates 1 will tend to unroll and to remain flat until assembled within the frames.

Whereas the prior art feeding or watering troughs usually left the manufacturer in an assembled undetachable condition, possibly with welded joints, my improved trough may be completely disassembled or detached so that it will therefore require the minimum shipping space with consequent reduction in transportation charges. All of the parts including the rods and studs may be readily galvanized, if desired, so as to be rustproof. The design is such, particularly the manner in which the rods 3 are caused to pass through the rolled edges of the plates 1, that a very rigid form of trough is obtained that can withstand rough treatment from the animals that feed therein, and it is impossible to twist the trough out of shape or in any other way to cause damage thereto.

Figure 7 shows a modified form of trough, the changes over the trough shown in Figs. 1 and 3 being mainly in the structural form of the end and intermediate frame members. The end frames 23 are preferably pressed from sheet metal and have several levels of dished-out portions, one of them taking a circular shape as indicated at 24. The portion 24 is adapted to be cutout if necessary to leave a circular opening for receiving an auxiliary trough (not shown) provided with a level float, or for receiving a water heater (not shown). Immediately surrounding the portions 24 there is a level of metal 25 which is less deep than the portion 24 and at the lower corners 26 the pressed out portion is somewhat deeper than the level 25 but less than that of the circular portion 24. A flange 27 surrounds the outer periphery of the end portion to give it strength in the transverse direction. There is a pair of lugs 28 provided with an opening 29 which extends outwardly from the portion 25 at each side of the frame. The openings 29 loosely receive the studs 13.

The two upper corners of the end members are provided with corner pieces 30 in any suitable manner and openings 31 pass through these pieces for also receiving some of the studs 13. It is apparent as in the case of the end frames described hereinbefore that the end frames of the modified structure shown in Figure 7 are also closed. The frame members 23 are provided at the lower corners with triangularly shaped projections 32 which serve as feet for the trough when assembled.

The intermediate frame members 33 of which two are shown, assuming a three section trough, are preferably formed of sheet metal which is bent to a U shape, and in section conforms to a T. In order that these frames shall be rigid, particularly since they are open at the top and have no cross member when disassembled, the frames are formed of double thicknesses of metal and these metal thicknesses are held together due to the stiffness of the metal. Holes 33a are drilled through the outer top portion of each frame. The inner webs of the T section are given an angular flare outwardly as indicated at 34 so as to provide V-shaped recesses 35 at each side of the frame member, which recesses extend over substantially the entire leg of the member. At the two upper ends of the frame, at opposite sides of the legs of the V, the webs 34 are brought together as indicated at 36 to provide an opening 37 which loosely receives one of the studs 13. A pair of feet 38 having generally a triangular configuration is secured to the outer surface of each intermediate frame member 32 in any suitable and well-known manner. These feet are provided at the opposite lower corners of the frame member and have an opening 39 which loosely receives one of the studs 13.

Each of the frame members 33 is provided with a cross brace 40 which has an inverted U-shaped cross section and is bent at its ends 41 to provide overhanging portions which have openings 42 therein. These openings coincide with the openings 33a in the frame members and they receive bolts 43 for securing the brace 40 to the upper surfaces of the frame member.

The rods 3 are threaded through the rolled edges 2 of the plate members 1 which may also be galvanized as in the case of the trough described hereinbefore and the plates are formed to a semicircular shape by reason of the recesses 35 in the intermediate frame members. The outer edge 44 of the depressed portion 25 of each end frame member also constrains the plates 1 to their proper shape so that when the studs 13 are inserted in the openings provided for them in the intermediate and end frame members and the nuts 14 are tightened all of the parts will have been rigidly secured together to form a three section trough. It will be understood that the studs 13 are threaded through the openings provided in the feet of all of the frame members to increase the rigidity of construction as was explained in connection with the other form of trough. It may be desirable to cut out a small circular notch or slot 45 through each vertical rib of the braces 40 in order that these braces shall clear the upper surface of the immediately adjacent parts on each side of the openings 37 in the intermediate frame members.

This modified trough structure also lends itself readily to assembly and disassembly so that it can be shipped in a knocked-down form and installed by the ultimate user who will probably be a farmer. It will be noted that the rods 3, 4 and also the studs 13 are all of the same respective lengths and size so that it is impossible to assemble the trough incorrectly and it is further apparent that no tools are necessary other than a small monkey wrench to complete the entire assembly. This is of extreme advantage in case farmers are called upon to assemble their own troughs where there is sometimes a scarcity of tools.

As shown in Fig. 8, I may, if desired, employ corrugated metal sheets or plates for the elements 1 or these sheets may be smooth or plain over practically their entire length except at the edges which could be corrugated. It has been found that when these corrugated edges are inserted in the recesses formed within the frame members and the assembly is drawn tight through the rods 3, 4, the corrugations tend to straighten out slightly, thus producing a strong clamping effect at the joints. This in turn assists the sealing compound 19' in rendering the joints strictly fluid tight. It is obvious that the corrugations, particularly if they extend the entire length of each of the sections, increase the strength of the metal and accordingly serve to render the structure very rigid with consequent increase in useful life.

While I have described the shell members 1 as being made of sheet metal, preferably galvanized, it is apparent that other materials could be used for this purpose, sheets of plastic or fiber board, in fact any material, metal or non-metal which can be bent without cracking to form an inclosure. It is also evident that the frames could be made out of plastic or other materials and if desired may be molded to shape although as I have already explained metal is preferred for all of the various parts so that such parts which come in contact with the liquid may be readily galvanized or otherwise rendered immune to liquid or to atmospheric humidity.

It will be understood that I desire to comprehend within my invention such modifications as come within the scope of the claims and the invention.

Having thus fully described my invention what I claim as new and desire to secure by Letters Patent is:

1. A trough comprising a plurality of frame members having a U-shaped configuration, interposed flexible members formed of sheet metal and having a pair of opposite edges rolled to form a channel, a brace detachably secured between the open ends of each U-shaped member, guiding grooves in each U-shaped portion of the frame members for receiving the ends of the flexible sections and constraining said ends to a configuration of that of the U-shaped members, means including rods removably secured in the channels at the edges of said flexible members for detachably holding the flexible members and frame members together, and closure members at the ends of said trough and also secured thereto by said rods.

2. A trough comprising a pair of end frame members forming the end closures and intermediate U-shaped frame members, flexible sections interposed between said frame members, guiding means in said frame members for receiving the ends of said flexible sections and constraining the said sections in U-shaped formations, the upper edges of said sections being rolled to form channels, means including rods extending through said channels and frame members for holding said channels and frame members in detachable engagement, and transverse ties extending between the upper ends of the legs of at least said intermediate frame members to provide for lateral rigidity of said trough.

H. HIX WOLFE.

REFERENCES CITED

The following references are of record in the file of this patent:

UNITED STATES PATENTS

| Number | Name | Date |
|---|---|---|
| 430,950 | Hicks | June 24, 1890 |
| 436,397 | Burton | Sept. 16, 1890 |
| 659,157 | Richards | Oct. 2, 1900 |
| 678,913 | Stephenson | July 23, 1901 |
| 795,484 | Coble | July 25, 1905 |
| 879,559 | Lee | Feb. 18, 1908 |
| 1,127,976 | Ely | Feb. 9, 1915 |
| 1,252,204 | Valeri | Jan. 1, 1918 |
| 1,344,089 | Poland | June 22, 1920 |
| 1,742,019 | Williams et al. | Dec. 31, 1929 |

FOREIGN PATENTS

| Number | Country | Date |
|---|---|---|
| 381,522 | Great Britain | Oct. 6, 1932 |